US007530275B2

United States Patent
Wiedemann et al.

(10) Patent No.: US 7,530,275 B2
(45) Date of Patent: May 12, 2009

(54) PRESSURE SENSOR SET IN AN OPENING OF A WALL

(75) Inventors: Wolfgang Wiedemann, Kaufbeuren (DE); Rainer Wunderlich, Kaufbeuren (DE)

(73) Assignee: KMW Kaufbeurer Mikrosysteme Wiedemann GmbH, Kaufbeuren (DE)

( * ) Notice: Subject to any disclaimer, the term of this patent is extended or adjusted under 35 U.S.C. 154(b) by 124 days.

(21) Appl. No.: 11/473,054

(22) Filed: Jun. 23, 2006

(65) Prior Publication Data

US 2007/0006641 A1 Jan. 11, 2007

Related U.S. Application Data

(63) Continuation of application No. PCT/EP2004/013970, filed on Dec. 8, 2004.

(30) Foreign Application Priority Data

Dec. 23, 2003 (DE) ................................ 103 60 941

(51) Int. Cl.
*G01L 13/02* (2006.01)

(52) U.S. Cl. ............................ 73/715; 73/753; 73/756; 361/283.1

(58) Field of Classification Search ........... 73/700–756; 361/283.1–283.4
See application file for complete search history.

(56) References Cited

U.S. PATENT DOCUMENTS

| | | | | |
|---|---|---|---|---|
| 4,753,109 | A | 6/1988 | Zabler | 73/115 |
| 5,488,868 | A * | 2/1996 | Ootake et al. | 73/708 |
| 5,712,424 | A * | 1/1998 | Reed | 73/115 |
| 5,714,680 | A * | 2/1998 | Taylor et al. | 73/37 |
| 6,622,549 | B1 * | 9/2003 | Wlodarczyk et al. | 73/119 A |
| 7,263,891 | B2 * | 9/2007 | Oda | 73/715 |

FOREIGN PATENT DOCUMENTS

WO WO2004/081510 9/2004

* cited by examiner

*Primary Examiner*—Andre J Allen
*Assistant Examiner*—Jermaine Jenkins
(74) *Attorney, Agent, or Firm*—Jacobson Holman PLLC

(57) ABSTRACT

The invention refers to a pressure sensor comprising a membrane which separates a measuring device receiving the deformation of the membrane caused by pressure from the pressurised pressure space.

Figure 1:
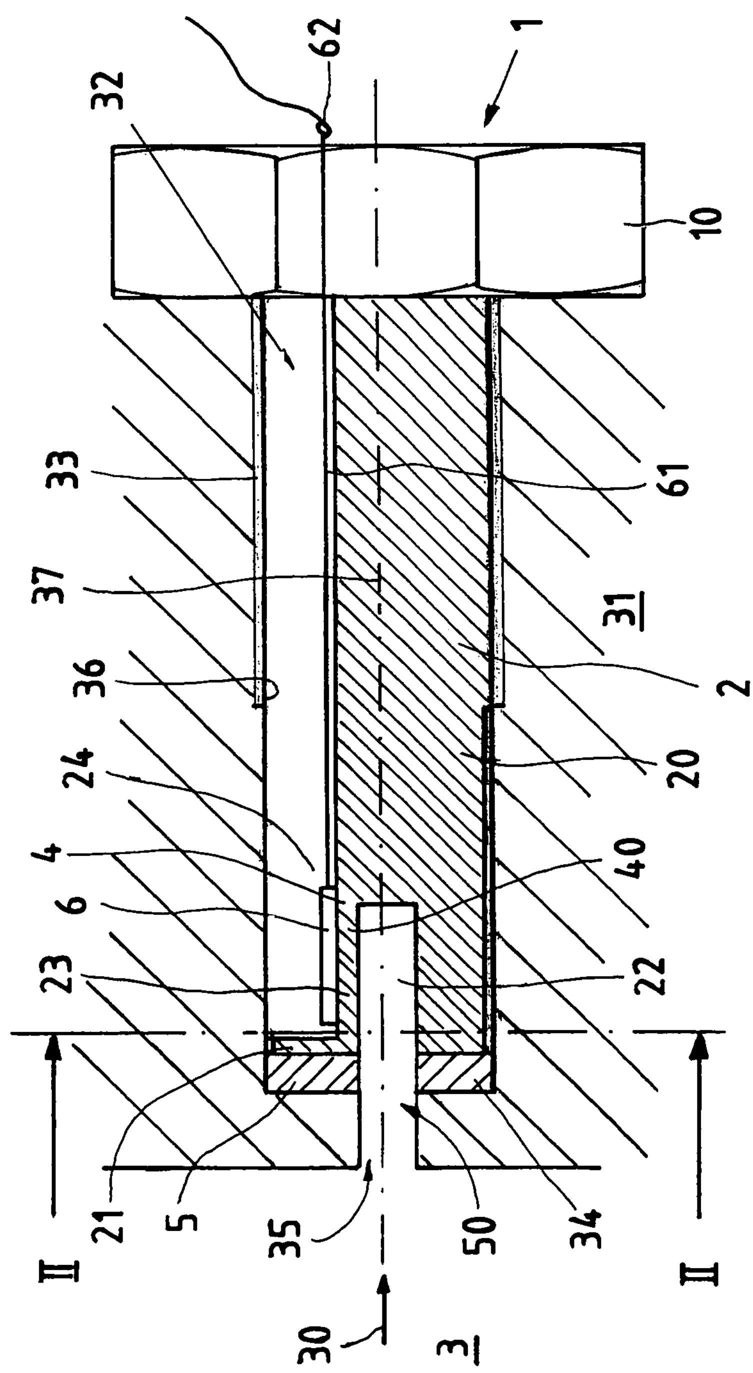

The pressure sensor is formed by a basic body. The pressure sensor is set in a wall defining the pressure space. The membrane is orientated essentially parallel to the surface normal line of this opening.

20 Claims, 7 Drawing Sheets

II 21 5 35 30 3 50 34 22 40 20 2 31 61 10 1 62 32 33 37 36 24 4 6 23 II 1
62
10
7
32
61
31
37
6
25
70
4
41
60
33
3

28
63
10
29
27
64
1
24
61
23
4
60
6
26
22

28
63
10
27
24
42
26
22

63
10
27
61
43
44
4
60
26

PRESSURE SENSOR SET IN AN OPENING OF A WALL

This is a continuation of PCT/EP2004/013970 filed 8 Dec. 2004 and published in German.

BACKGROUND OF THE INVENTION

The invention refers to a pressure sensor comprising a membrane which separates a measuring device receiving the deformation of the membrane caused by pressure from the pressurised pressure space, and where the pressure sensor is formed by a basic body which is set in an opening of a wall limiting the pressure space.

Pressure sensors of the before mentioned type are known for example from the European patent application 392 486. Here a pressure sensor for the combustion space of piston internal combustion engines is described.

The arrangement is here chosen in such a way that the membrane is orientated parallel to the wall defining the pressure space. The membrane is also arranged unprotected at the end of the sensor projecting into the pressure space. This unprotected construction may also lead to the result that, for example, the membrane will be damaged during mounting, and then the pressure sensor is useless. The size of the membrane is restricted in this modification by the available opening in the pressure space, and pressure sensors of this known kind cannot be built in the cylinder head as there only a very small opening may be provided as the rest of the space is occupied for example by admission and discharge valves.

BRIEF SUMMARY OF THE INVENTION

Coming from this state of the art it is the object of the present invention to suggest a pressure sensor which is as reliable as possible.

This problem is solved by a pressure sensor, which is equipped as described in the beginning, and where it is provided that the membrane is arranged parallel to the surface normal line of the opening or forms an acute angle with it.

In contrast to the suggestions of the state of the art the membrane is not orientated parallel to the wall, but preferably rectangular, that means parallel to its surface normal line (this extends perpendicular to the plane assumed in the opening). By means of that it is easily possible to protect the sensitive membrane, to arrange for example a suitable housing. The housing here has, of course, a recess so that the membrane can be connected with the pressure space.

Often a pressure according to the invention is built in a cylinder-like combustion chamber the wall of which is, for example, the surface area of the cylinder, or the installation space is designed spherical (for example in the cylinder head). In this case the opening is not defined by a plane surface, but maybe by an accordingly bent surface. In this case the opening has to be understood in that respect that it is the opening in view, and the membrane surface is orientated parallel or acutely to the surface normal line of the opening shown in this view.

Another possibility to define the preferred orientation of the membrane is in relation to the mounting direction of the pressure sensor in the wall. Often the pressure sensor is built in the body surrounding the pressure space, for example the cylinder wall or the cylinder head, and first of all a suitable boring has to be provided in the wall. This boring is defined by a longitudinal axis which is usually parallel to the surface normal line. Thus also the direction of installation is parallel to the surface normal line according to this application.

A particular advantage of the invention is the fact that by means of this arrangement of the membrane according to the invention the available surface of the membrane is no more depending on the opening in the wall. The membrane may extend rectangular to the wall and be optimised according to the desired features. This presents the opportunity to install the pressure sensor according to the invention for example in regions where usually there is only space available for a small opening, and where the known pressure sensors cannot be installed because of the required space, respectively opening.

Therefore the invention combines optimal protection of the sensitive membrane with a very space-saving arrangement of the sensor in the pressure space without the necessity to design the membrane very small which would reduce the accuracy of measuring.

Of course, the pressure sensor needs a suitable access to the pressure space the pressure of which has to be measured. Conveniently a boring is provided for that purpose in the wall defining the pressure space in which the pressure sensor is set in.

In a preferred modification of the invention it is provided that the basic body has a membrane recess or membrane opening in which the membrane is set in and sealed, for example welded or bonded.

In order to realise the pressure sensor according to the invention the invention suggests two modifications. In the first modification just presented a multi-piece construction is suggested where at least membrane and basic body are parts which have to be assembled. A one-piece design is referred to in the following.

The multi-piece modification has corresponding advantages in the production of the pressure sensor. As it is provided that the membrane carries the measuring device receiving the membrane deformation caused by pressure, it is convenient to prepare the membrane as an individual component with the measuring device, and then to install the membrane in the basic body which may serve as carrier, respectively as housing of the membrane. It is also possible to produce the membrane in the multi-piece design from another material than the basic body. In order to be able to mount the membrane suitably, at the basic body a membrane recess or membrane opening is provided. The membrane closes the opening as the membrane is designed to act as seal surface between the pressurised and normal-pressure space. The arrangement, however, may be chosen in such a way that a membrane recess is provided in the basic body and it is closed by the membrane. In this case, for example, the membrane would be mounted from the pressurised side, in the region covered by the membrane, for example, the evaluation electronics could be arranged.

Conveniently it is provided that the pressure sensor has contact lines for connecting the measuring unit with a link region or an evaluating unit. The information received by the measuring device is conveyed to the outside by the contact lines. It is, for example, provided that the pressure sensor also just comprises an evaluating unit or only a link region, for example plugs and so on, are provided, and the evaluating unit is provided removed from the sensor. Of course, it is also provided that an evaluating unit has then a link region in order to convey the determined data accordingly.

Conveniently it is provided that the contact lines are provided at the side opposite the pressure space. According to the invention it is provided that at least one contact line is provided, however, conveniently several, for example four, contact lines are arranged parallel. By the suggested position the contact lines are protected by the membrane from the pressure in the pressure space. The contact line may here be designed, for example, cable-like or wire-like, or the contact line is designed as strip conductor, for example in thin-film technology.

It is a considerable advantage that the membrane is part of a membrane holding device, and the membrane holding device is in particular set in the membrane recess and/or membrane opening of the basic body. The handling of such a modification according to the invention is made easier as the membrane holding device carries the sensitive membrane only in a certain region. As the membrane has to have a certain mobility here at least only the region of the membrane is subjected to the pressure, the rest of the membrane holding device is, for example, imbedded closely, bed-like (for example in the installation recess) in the basic body, and the design of the basic body is such that the membrane is offered a safe support, and only the region of the membrane holding device acts as membrane which also interacts with the corresponding measuring device. A membrane holding device is not provided compulsory, however, it makes guiding, respectively mounting, easier.

Cleverly the arrangement in a modification according to the invention is chosen in such a way that the membrane holding device carries contact lines. Here the membrane holding device comprises, on the one hand, the membrane, on the other hand, the membrane holding device takes over the task of positioning and holding the membrane at a suitable place. Furthermore the membrane holding device also takes over the task of providing contact lines by means of which the measuring device is connected to the evaluation unit arranged at a distance from the membrane and so on. The basic body is, as already described, clearly larger as it also fulfils the function of a housing for the sensor. The manufacturing process becomes considerably cheaper if not the complete pressure sensor, for example in a thin-film coating procedure, is equipped with the contact lines, but only the membrane holding device. Coating the pressure sensor, which has a large volume, only in a certain region would be expensive, in contrast to that the coating only of the membrane holding device with contact lines and the measuring device leads to a very high efficiency and to a clearly better rate of utilisation of these expensive coating installations.

Furthermore the multi-piece construction makes it possible that the membrane, respectively the membrane holding device as well as the basic body can be optimised with reference to their respective functions and features.

Cleverly the membrane holding device is designed longitudinally, and the contact lines extend preferably parallel to this longitudinal extension. The result is that attaching of suitable wires or cables for transferring information may not be carried out in the front region where the membrane is located, as there possibly during operation considerable temperature pinnacles occur which may possibly damage the cable connection.

However, at a certain distance from the membrane there is already a certain temperature gradient which already helps in the known connection techniques (bonding process) to produce permanently a stable, reliable electric connection.

It has been described that the membrane is sealed tightly in the basic body, for example is welded. For that purpose, for example, suitable laser welding processes are used which make it possible to carry out even very delicate weldings. It has to be taken into consideration that the membrane still has to have certain flexibility, and the welding process should not influence or destroy the function of the membrane.

The pressure sensor comprises, in another modification according to the invention, a basic body where the membrane is linked, respectively designed, in one piece. The membrane is here produced by a material weakening of the basic body at a suitable point. The advantage of the invention is, in this modification, just the fact that a separate component is not required, and the basic body is designed in such a way that a part of the basic body serves as membrane. This can be reached by a suitable cutting or material-removing machining without any problems. In this modification expensive assembly and connection techniques are not necessary. The one-piece design is also tight from the beginning, and no additional efforts are necessary here. However, both modifications, the one-piece as well as the multi-piece described above, are part of the invention, and either has corresponding advantages.

As it is suggested that the pressure sensor according to the invention is set in simply in a boring of the wall defining the pressure space, the pressure sensor can be used in any way. According to the invention here several modifications are possible how the basic body according to the invention can be set in the wall defining the pressure space. In the first modification the basic body has a thread which can be screwed in a boring of the wall. Here the basic body has conveniently a suitable external thread. The wall boring may be here either a continuous boring or a blind boring with an opening connected to the pressure space. This modification has the advantage that a pressure sensor which has to be set in here comprises a low number of components.

In another modification it is an advantage that the basic body is built in the wall defining the basic body indirectly, and that means by means of a sleeve holding the basic body. The sleeve has here an internal and an external thread. With the external thread the sleeve can be screwed in the boring, this may again be a continuous boring or a blind boring, and with the internal threads the basic body is connected with the sleeve.

In another preferred modification of the invention it is provided that the membrane is worked from the basic body in one piece. The membrane is also still a delicate component. The quality of the membrane defines eventually the quality of the pressure sensor. However, it has been found that the same quality of the pressure sensors can be realised, if the membrane is worked from the basic body in one piece. The suggestion according to the invention saves expensive assembly work of the membrane at the membrane holding device. For the working-of of the membrane by a suitable material weakening of the basic body there are cutting or material-removing machining procedures which secure a sufficiently high quality and reproducibility. Besides the usual known cutting machining techniques, here also suitable laser machinings or laser cutting procedures are known and can be used.

In a preferred modification of the invention it is provided that the thread is located in the back region of the basic body. The location back refers here to the direction of installing. Front in this connection is the region of the pressure sensor where the membrane is arranged. It is completely sufficient here to equip only a part of the basic body with a thread, and to screw in and attach that accordingly strongly in the wall.

The invention furthermore provides that the pressure sensor is set in a blind boring in the wall, and in the bottom of the blind boring an opening to the pressure space is provided. Such a design is convenient in that respect that the bottom of the blind boring is used for sealing.

As far as in the following a blind boring or a pocket hole in the wall defining the pressure space is mentioned, it is always a pocket hole-like boring with an opening in the bottom.

In a preferred modification of the invention it is provided that the basic body tapers from the back to the front. The arrangement is here chosen in such a way that the diameter of the basic body in the back region where the thread is arranged is larger than in the front region where the membrane is located. The design is clever in that respect that the tapering design of the basic body, of the blind boring and the wall where the pressure sensor is set in, for example screwed in, interact in such a way that only a relatively small opening has to be provided in order to produce a connection of the pressure sensor with the pressure space.

In a preferred modification of the invention it is provided that the basic body comprises several individual parts which can be connected fixedly to one another.

The basic body is, in a first modification, designed in one-piece, and produced, for example, in a cutting process from a piece of metal. However, it may be even convenient to carry out installations which then are protected accordingly by exterior parts of the housing. The result is that the basic body comprises several individual parts which then are connected fixedly to each other, for example welded or bonded. Here the same connection techniques may be applied as for connecting the membrane holding device with the basic body.

Conveniently the opening and the blind boring are carried out co-axial. The exact position of the pressure sensor in the blind boring is not decisive here as the pressure sensor is always orientated optimally to the opening.

Conveniently a seal is arranged between the pressure sensor and the bottom of the blind boring. The seal seals, of course, also the membrane faces from each other. The seal is here designed either disc-like or annular and has conveniently an opening. By means of the opening there is a connection between the blind boring and the pressure space.

It has also been found to be an advantage if the pressure sensor has a supporting edge which is arranged in the region of the membrane and interacts in built-in condition with the seal. The support edge serves in this modification according to the invention for improving the mechanic stability of the membrane. It is also has the task to seal the membrane better and more reliable at the seal as the support edge has a certain width. Conveniently here the support edge is also worked in one piece from the basic body. This is possible by a suitable highly accurate mechanic machining.

For the design of the support edge there are several possibilities. It can, for example, extend web-like, or be designed disc-like and sit close to the edge of the cylinder of the boring. This disc-like or half disc-like design has furthermore the advantage that a comparatively large seal surface is at disposal which is able to interact with the seal.

Furthermore the support edge has the task in another modification according to the invention to support the membrane against the cylinder wall of the boring. In a first modification of the invention it is provided that the membrane is arranged freely protruding collar-like at the basic body. In an improvement of this design it is provided that the membrane is held at least on two sides, namely is linked at the one side to the basic body and on the other side carries the support edge which supports the membrane preferably against the cylinder wall of the boring or even the bottom of the blind boring. The mechanic stability of this arrangement is thus increased.

In another modification of the invention it is provided that the front end of the pressure sensor has a cone-like seal receiver, and the seal receiver interacts with the wall surrounding the opening.

The object of the seal receiver is very similar to the object of the support edge described above or almost identical. The seal receiver is here designed in such a way that it seals without any additional mechanic seal. Suitable cone receivers are known for that purpose. The advantages mentioned before in the design described with the support edge can be transferred in the same way to the design described here with the seal receiver.

It is furthermore provided in a modification according to the invention that the opening of the wall, the opening in the seal and the blind boring in the wall are co-axial. An exact radial orientation of seal and pressure sensor in the boring is not decisive here anymore.

In a preferred embodiment of the invention it is provided that the pressure sensor has a preferably pocket hole-like recess on its end facing the pressure space, respectively its front face, and this recess of a material weakening at least co-serves for forming the membrane.

The basic body is designed preferably bolt-like. This pocket hole-like recess serves for producing a material weakening in the basic body, and thus design a wall of the basic body which serves as membrane. Here the measurement may be sufficient alone for forming the membrane, however, it is also convenient, if necessary to combine this recess with another measurement.

In a modification of the invention it is suggested that the basic body has on its end facing the pressure space a preferably pocket hole-like recess. This pocket hole-like recess connects the pressure space with the side of the membrane facing the pressure.

In a development according to the invention it is suggested that this recess at least co-serves for a material weakening for forming the membrane. In particular in the one-piece embodiment it is possible, by means of a suitable design of the pocket hole boring, to design the membrane just in the concerned region.

The arrangement of the membrane in the pocket hole-like recess has the considerable advantage that the membrane is thus well protected against damage, however, nevertheless there is a connection with the pressure space.

Furthermore it is provided, according to a modification according to the invention, that the basic body has a flattening in the region facing the pressure space. Usually the basic body is designed as lathe work, for example pipe-like or bolt-like (also with shoulders, projections and so on), and has a spherical area surface. The flattening has the result that the basic body is designed flatly sectionwise which, on the one hand, makes installation easier, as elements arranged on the flattening, for example the contact lines, are not damaged during installation. They are already set back compared with a sleeve into which the basic body is pushed in, and thus are protected. Furthermore it is suggested that the flattening at least co-serves as a material weakening for forming the membrane.

Of course, it is possible that at the basic body even several flattenings are provided, the flattening, for example, being designed in such a way that a lip or membrane slab remains. However, it is also possible to combine this flattening with the recess, and to use the forming small web between the flattening and the recess as membrane.

It is convenient that the flattening carries the contact line/s. The contact line/s is/are, for example in thin-film technology, applied in a way still to be cited. The flattening leads to a plane surface on the basic body which, for example, makes applying the thin film easier as the coating, in particular when masks are used, is carried out more accurately and exactly on plane surfaces.

For the orientation of the membrane there are several variants here also. First of all it is provided, according to a modification of the invention, that the membrane extends essentially parallel to the axis of the boring (the surface normal line). This is in particular the case when a suitable recess is provided for forming the material weakening which is worked in in the direction of the axis in the basic body. However, the invention is not defined to that. There is also the possibility that the membrane extends essentially rectangular to the axis of the boring. Of course, the invention also comprises solutions where the membrane includes any angle with reference to the axis of the boring.

In another modification of the invention it is provided that the membrane is designed disc-like. Such a design can be realised by the use of a material weakening in the basic body. For that purpose, for example, the membrane is produced by an under-milling of the basic body. It is possible, by a suitable design, shown for example in FIG. 3, to realise a membrane slab In a preferred modification of the invention it is provided that the basic body carries a sleeve, and the sleeve can be connected tightly, in particular screwed in, in a boring in the wall.

Here the sleeve here serves also for supporting the membrane mechanically in such a way that the membrane is supported at least by a part of the sleeve edge. By means of that the membrane is again held and guided on several sides, and worked from the basic body in one piece, and connected tightly to it.

Conveniently it is suggested that the basic body has a final opening at its end opposite the pressure space which holds the evaluating unit and/or the link region. In the region of the final opening, for example, also the thread for fastening the basic body in the wall is provided. This region of the basic body is comparatively wide as it tapers conveniently to the front in the direction of the membrane. As the evaluating unit, respectively the link region, has a certain extension it is convenient to install these elements in a final opening provided at the end so that the basic body protects these elements like a housing.

Cleverly here the evaluating unit is arranged on a board, and in the final opening guide grooves are arranged for holding the board.

By means of the arrangement of guide grooves the board is guided reliably. Cleverly the guide grooves are orientated parallel to the longitudinal axis of the basic body and arranged diametrically in order to use the maximal width of the basic body. So sufficient space is created for realising the evaluating unit on the board. The board can have here also individual, additional links so that for example suitable control lines can be linked. The board comprises thus also a link region. The design with guide grooves has also advantages with reference to the transmission of temperature, as because of the relatively slight mechanic contact there is only a slight heat flow in the board. The guide grooves form only a slight, respectively small, thermal bridge.

In another modification according to the invention it is provided that the contact lines have, at least on their sides opposite the membrane, contact surfaces in order to make attaching of the contact lines to the evaluating unit possible. The attachment of contact lines is carried out for example by suitable connecting processes like bonding or soldering. The result there is an electrically conductive connection which can be loaded within restrictions. However, if an accordingly larger contact surface is made available the connecting can be done easier and more reliable.

It is an advantage that in another modification according to the invention the flattening has, on its end opposite the membrane, an opening to the final opening. This modification can be seen in particular well in FIGS. 4, 5 (reference number 27). By means of this embodiment it is achieved that the again sensitive link region of the preferred final opening is installed and protected by the back part of the basic body. The flattening arranged on the exterior face is connected through the suggested opening with the final opening accordingly in order to be in particular able to arrange contact lines. Cleverly then over the complete arrangement a sleeve is pushed, which also covers the flattening, and thus the arrangement altogether is protected.

According to the invention it is provided that the measuring device is designed working resistively, capactively or inductively. The arrangement is chosen in such a way that the deformation of the membrane caused by pressure changes the resistance, the capacity or the inductivity of a corresponding component, and these parameters are collected and evaluated for measuring the pressure. A preferred arrangement is, for example, given by the design of the measuring device as an elastic measuring strip arranged on the membrane. Such an arrangement is, for example, a suggestion for a resistive or even capacitive design of the measuring device where possibly even a Wheatstone bridge circuit may be used. Additionally, however, it is suggested to arrange a temperature sensor at or on the membrane. Then for example five or six contact lines are provided, one or two for the temperature sensor. By means of the temperature sensors excursions of the membrane caused by temperature can be deducted, for example in the evaluating unit. However, even the information about the temperature is interesting as evaluation result.

For a high quality of the measuring of the pressure it has turned out to be an advantage that the measuring device is applied in a thin-film technology on the membrane. Such coating methods, generally known as epitaxy or sputtering method, make it possible to apply thin films of very different materials with different physical features on substrates, and to realise corresponding components. For example, a resistive or capacitive elastic measuring stripe is applied in a thin-film coating process on the face of the membrane opposite the pressure space, and the deformation of the membrane caused by pressure is evaluated and processed accordingly by the elastic measuring stripe.

In another modification according to the invention contact lines are provided on the basic body for the electric link of the measuring device. Cleverly also the contact line is designed also in thin-film technology.

As the contact lines as well as the elastic measuring stripe are electrically conductive it is, first of all, an advantage to apply an insulating layer on the basic body if it is also electrically conductive. This can be carried out also in thin-film technology, for example, first of all a layer of sapphire is applied. On this insulating layer then, preferably in thin-film technology, the contact lines are applied as well as the measuring device is realised. The advantage of such a design is the fact that the lines realised in thin-film technology work reliably, in particular for the fields of application of the pressure sensor where high temperature prevail. The otherwise known soldered joints for creating contact of contact lines to the measuring device are not sufficiently temperature stable and thus not reliable, either.

In particular the modification of the invention according to which the membrane holding device is arranged along the longitudinal extension of the basic body, and is, compared with the front end of the basic body, long, has the result that the membrane holding device extends from the front end of the basic body over a large region to the back, away from the front part holding the membrane at the basic body. If now the membrane holding device carries at the same time the contact lines, as it is conveniently also mentioned, the result with a modification of this type is that a connecting line has to be bonded only at a large distance to the hot pressure space. In this region already low temperatures prevail, so that the chosen linking techniques can be applied securely with the temperatures prevailing there. It has to be taken into consideration here that, of course, the pressure sensor, if it is used for example in a cylinder or a cylinder head, is cooled accordingly by the cooling provided at the cylinder head.

The given length relation is selected here in such a way that the membrane holding device has at least the length of the width of the front end of the basic body, and extends from that up to a factor of about 10 to 15. However, even larger relations can be reached which are also part of the invention.

It is provided here that at the end of the basic body opposite the pressure space the contact lines end in a link, and at the link, for example, a conventional cable and the like can be connected. The arrangement of the link at the end opposite the pressure space does usually not present any thermal problems as this link is removed relatively wide from the point where the pressure is measured, and where possibly also corresponding temperatures are created or occur.

It is suggested that the basic body, respectively the membrane is made from metal or sintered materials like ceramics and the like. Basic body and membrane do not have to be made compulsory from exactly the same material, they may be optimised for the respective problems by a particular material selection. It is also possible to use, for example, sintered materials like ceramics for the membrane, and to install this membrane in a basic body made from metal. A reverse procedure is also considered.

In a preferred modification of the invention it is suggested that the recess holds a glow plug. The recess is, according to the before mentioned, arranged at the front end of the basic body, and is in contact with the pressure space. By means of the recess the membrane gains contact with the pressure space, in order to measure its pressure.

The glow plug is here part of an arrangement known as heater glow plug or pencil type glow plug which is used, for example, for starting Diesel engines. The task of the glow plug is to heat the Diesel-air mixture in a time as short as possible to a temperature of about 850° C.

The opening which is present anyway for measuring the pressure is now used one more time cleverly by means of the suggestion according to the invention. The integration of the glow plug in the pressure sensor creates a combined pressure sensor with glow plug function from the pressure sensor. The opening provided already in the wall of the pressure space (for example of the engine space) has a considerable advantage by this development according to the invention as this single opening now has double use. The two applications do not interfere here with each other as the glow plug is used usually during the start phase of the engine, however, the pressure sensor is supposed to monitor the pressure condition when the engine is running. The two applications overlap only marginally, and even that is not damaging.

The design of the pressure according to the invention as a longitudinal design of the membrane, if possible parallel to the longitudinal extension of the pressure sensor, respectively rectangular to the surface normal line of the opening holding the pressure sensor, is completed here conveniently when the opening which is there anyway is used additionally by the glow plug. The membrane is arranged in such a way that the use of the glow plug is not impeded although the space conditions are extremely tight and narrow, for example at the cylinder head. Therefore the arrangement can also be used for retrofitting where, for example, the glow plug is modified as described according to a pressure sensor. Thus, without the necessity to arrange additional openings in the engine it may be retrofitted with pressure sensors according to the invention.

According to the invention it is an advantage that the glow plug is arranged at a distance from the interior wall of the recess, respectively the membrane. The arrangement is here chosen in such a way that a certain annular or sleeve-like space remains between the glow plug and the interior wall of the recess in order not to obstruct the measuring of the pressure by the membrane.

The arrangement here is chosen cleverly in such a way that the glow plug does not close the recess, and projects beyond the edge of the recess to the front. Such an arrangement is convenient as the glow plug is supposed to heat a volume in the engine space as large as possible anyway, and a possibly central arrangement of the glow plug makes this problem easier to solve.

The glow plug here comprises for example a glow tube which holds the heating spiral and control helix. Cleverly the arrangement is chosen in the development according to the invention in such a way that the region of the glow plug extending beyond the edge of the recess into the pressure space is heated when carrying current.

It is striven for here that only the space projecting into the pressure space is heated, that thus only there the glow spiral is heated when carrying current in order not to have the relatively high temperature act on the membrane directly, if possible. Here again the recess where the membrane is, for example, installed in the wall acts as an advantage as the wall here already acts as "thermal shield". The advantages just of this combination of tasks of a pressure sensor and the tasks of a glow plug in the pressure sensor according to the invention are surprising and multiplex as by means of this combination a membrane which can have actually any design is available which is arranged, mechanically well protected in a housing, along the longitudinal axis of the housing, respectively the longitudinal axis of the basic body, the arrangement altogether requires only a very small slight opening to the pressure space in which then even conveniently a glow plug may be integrated which does not obstruct the measuring of the pressure.

The invention is here not restricted only to a pressure sensor as described but it extends also to a pressure collecting arrangement, in particular for internal combustion engines. Basically the invention is suited for the use, for example, in combustion engines like Otto or Diesel engines, the arrangement being possible at any place in the cylinder or cylinder head. Of course, it is possible to arrange several sensors in one cylinder according to the invention, and thus to measure the pressure with time and place resolution. In the arrangement according to the state of the art, which is only possible in the cylinder seal, the possibilities of use are clearly restricted.

BRIEF DESCRIPTION OF THE DIFFERENT VIEWS OF THE DRAWINGS

Figure 2:
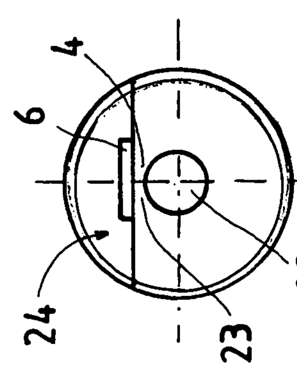
Figure 3:
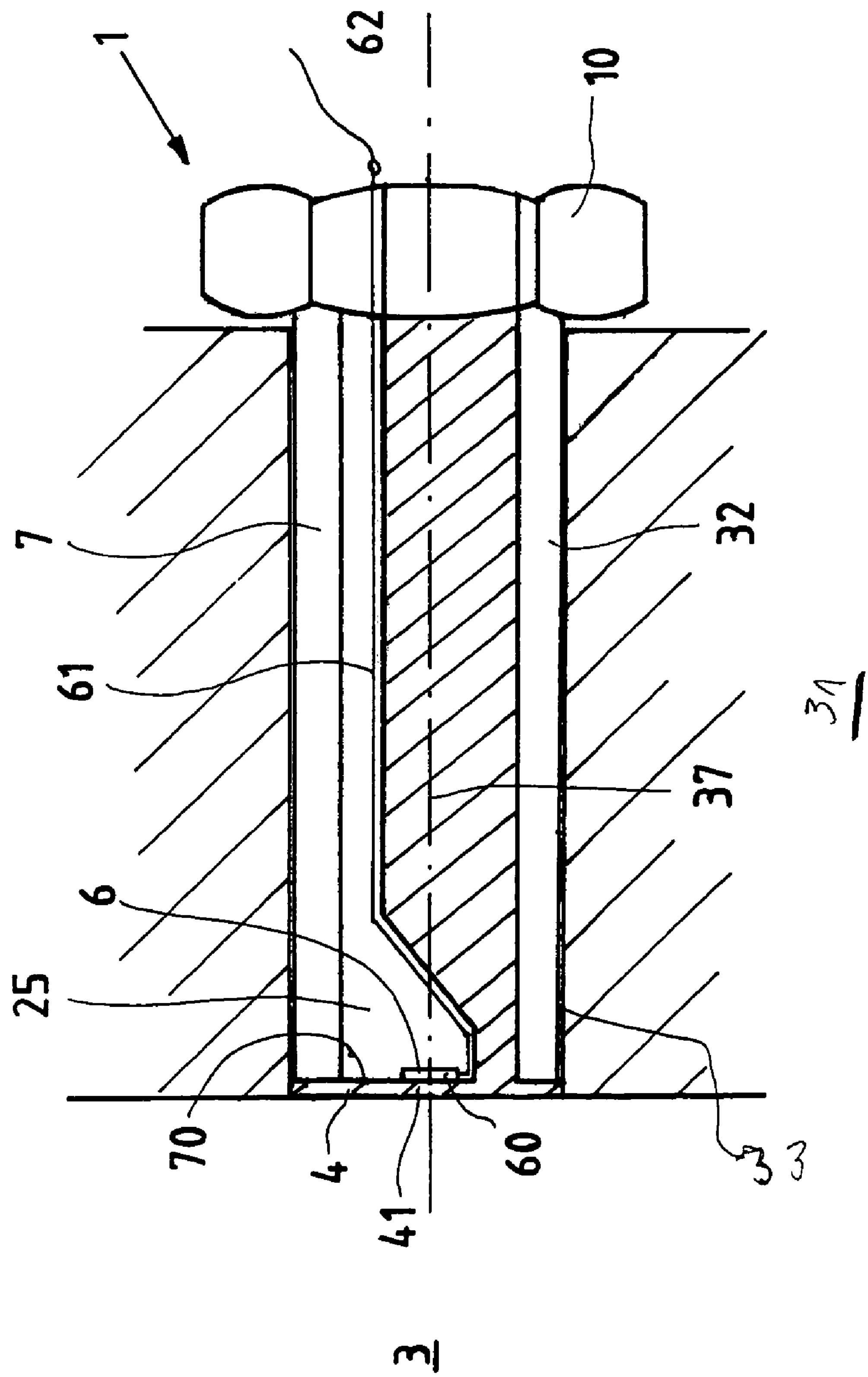
Figure 4:
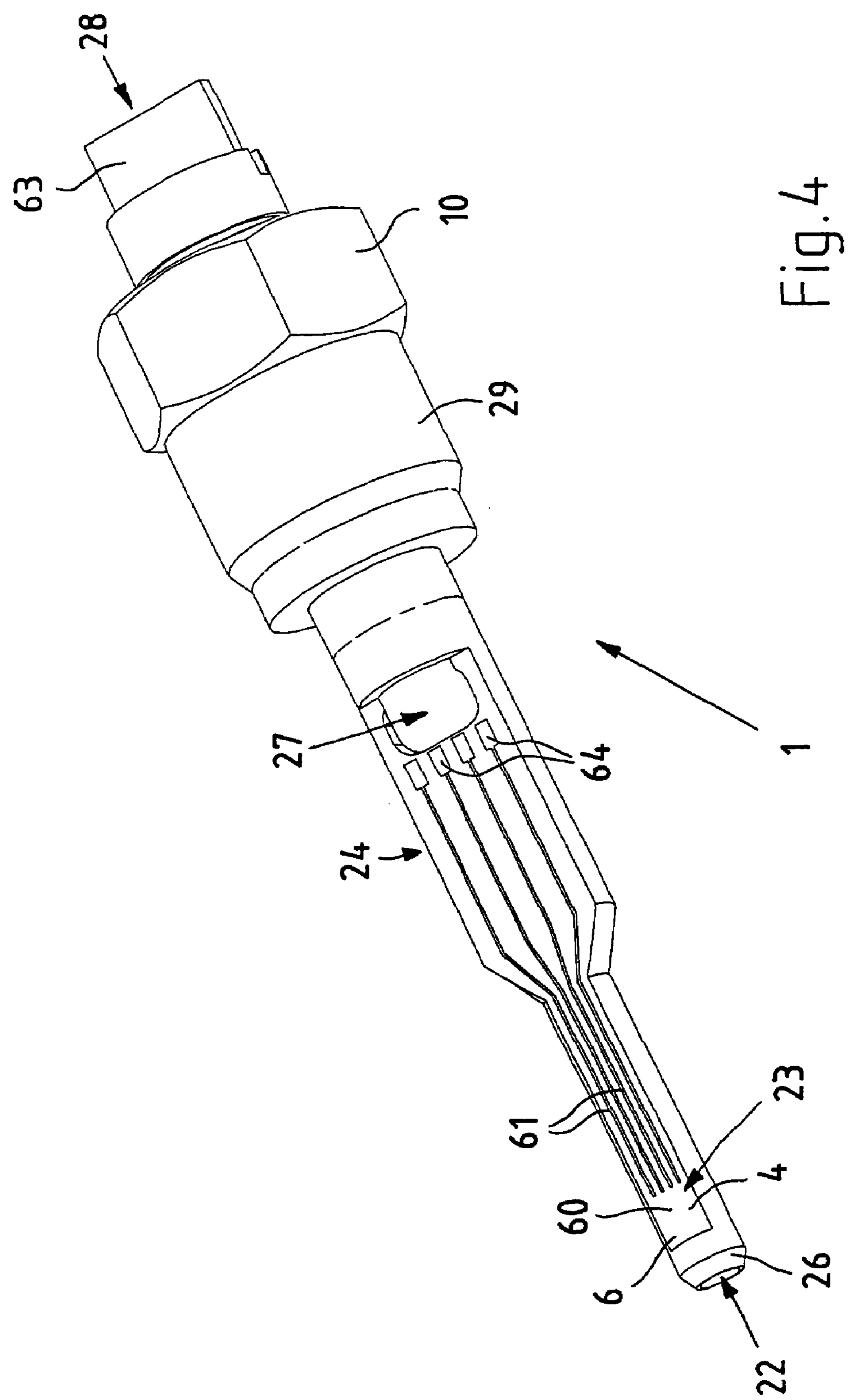
Figure 5:
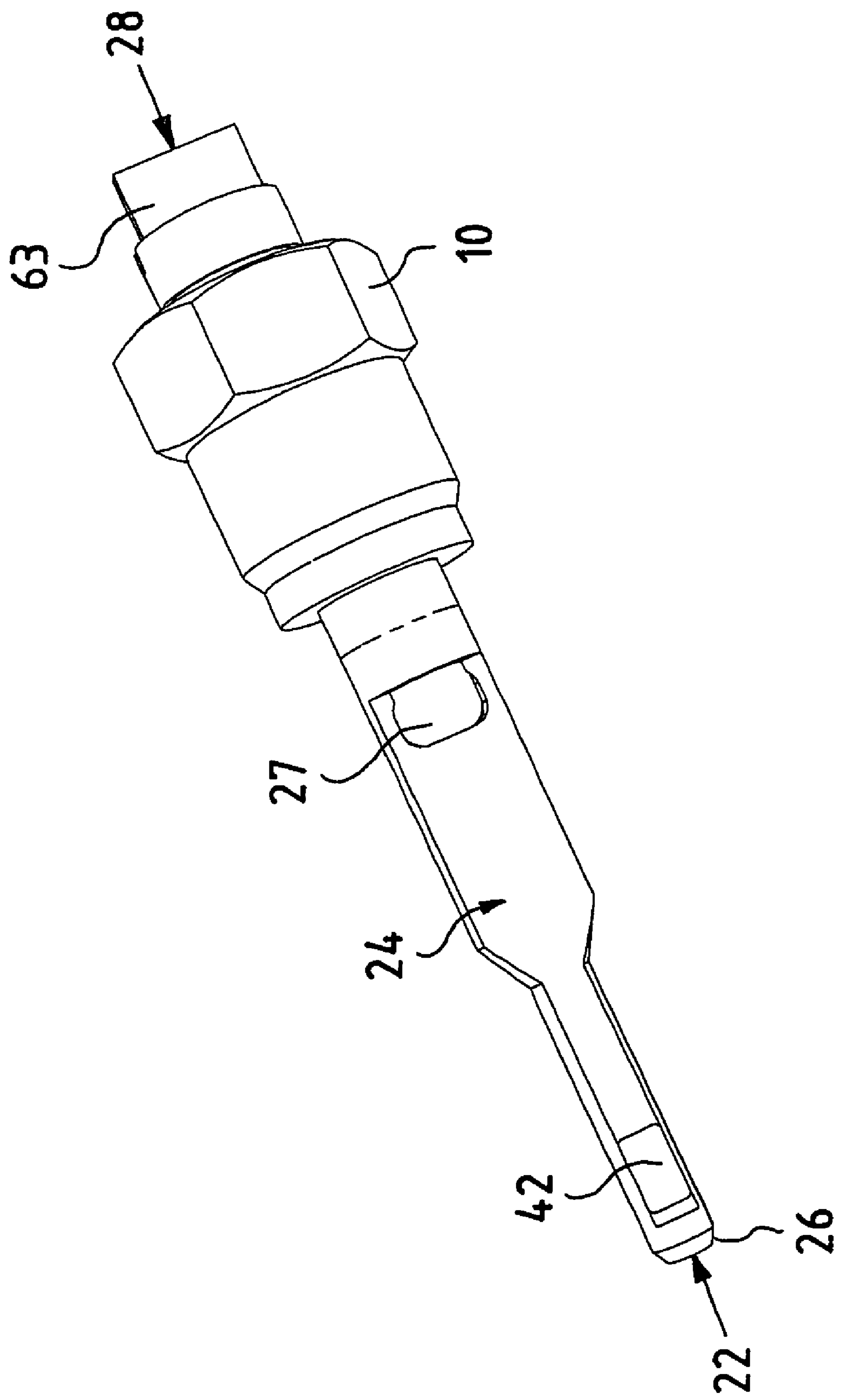
Figure 6:
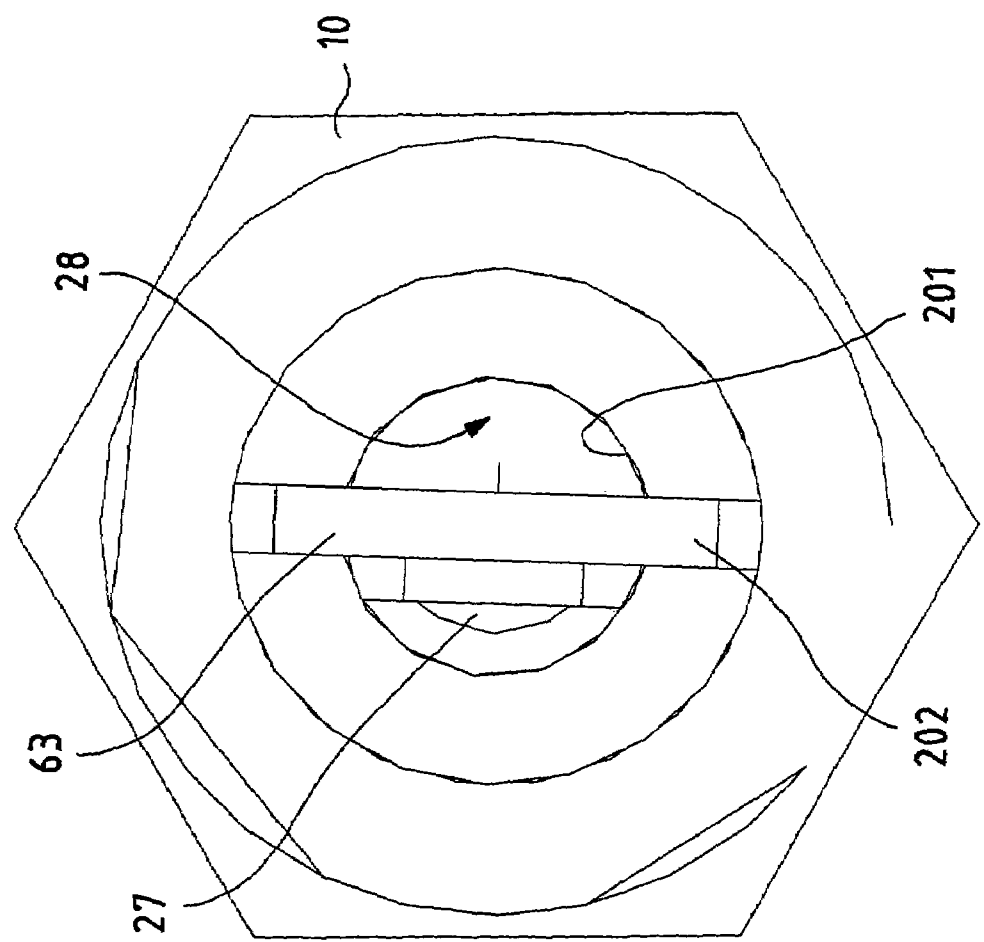

The invention is shown schematically in the drawing. In the drawings:

FIGS. 1 and 3 each a section of an application case of the pressure sensor according to the invention;

FIG. 2 a vertical section through the pressure sensor of the invention according to line II/II of FIG. 1;

FIGS. 4, 5, 7, 8 each in a three-dimensional view other embodiments of the pressure sensor according to the invention, and FIG. 6 a view from the back (enlarged) of the pressure sensor according to the invention of FIG. 4.

DETAILED DESCRIPTION OF THE PREFERRED EMBODIMENT

In FIG. 1 the pressure sensor 1 according to the invention is shown schematically. Pressure sensor 1 comprises a basic body 2 which is designed bolt-like 20. The basic body 2 is, however, for example also designed prismatically or cylinder-like, the prism being here all geometric figures which have axially extending surface lines which are parallel to each other. In the embodiment shown here the basic body 2 is over its complete length flattened in such a way that in particular in the front region facing the pressure space 3 a flattening 24 occurs.

The pressure sensor 1 is installed in a wall 31 which surrounds the pressure space 3. The pressure sensor 1 has an external thread and is equipped with a screw head 10 or a nut or the like on its back-side. The prevailing pressure in the pressure space 3 which has to be measured is referred to as 30. Here two modifications are possible. On the one hand the pressure sensor 1 can be installed in a blind boring 32 (according to FIG. 1), or in a continuous boring 32 according to FIG. 3.

In the solution with a blind boring 32 on the bottom 34 of the blind boring 32 a seal 5 is arranged. The pressure sensor 1, respectively the basic body 2, pushes in built-in condition on this seal 5.

The membrane 4 is formed according to the invention by a material weakening 23. This material weakening 23 of the basic body 2 is realised, on the one hand, by the flattening 24, and, on the other hand, by a recess 22 for example pocket hole-like which is arranged in the pressure space 3 on its front side, the end of the basic body 2 facing the pressure space 3. A web-like 40 membrane occurs. The recess 32 can also be formed by an undercut so that, for example, a membrane slab projecting like a free collar is formed.

The recess 22 is here linked to the pressure space 3 in such a way that in the recess 22 the same pressure 30 prevails as in the pressure space 3. For that purpose in the bottom 34 of the blind boring 32 an opening 35 is provided. Furthermore also the seal 5 has an opening 50 here, the seal 5 is designed annular or disc-like.

On the side of the membrane opposite the pressure 30 a measuring device 6 is arranged. The measuring device 6 serves for receiving the deformation of the membrane caused by pressure 30, and to provide it as a signal which can be evaluated. For that purpose the measuring device 6 is connected with contact lines 61 in such a way that preferably electric information, for example a potential drop or the like, depending on the type of the measuring device 6, is conveyed to the back side where the contact line 61 runs into a link 62.

The measuring device 6 as well as the contact line 61 is preferably applied in thin-film technology on the flattening 24 of the basic body 2.

As measuring device 6 preferably an elastic measuring strip 60 is used. However, also other concepts are known and can be used for that purpose.

In a first modification of the invention it is provided that the membrane 4 with its front end facing the pressure space 3 acts directly on the seal 5.

In another, alternative, improved embodiment the membrane 4 is linked at its front end facing the pressure space 3 to a support edge 21 which stabilises the membrane mechanically, respectively supports the cylinder wall 36. Additionally by means of this support edge 21 an improved sealing between the membrane and the pressure space 3 is generated, as a considerably larger seal surface is provided for interacting with the seal 5 at the support edge if this is designed for example in three segments.

According to the invention, however, both variants are possible, that means the arrangement with or without supporting edge 21.

The invention shown in FIG. 1 is characterised in particular by a very simple, but effective construction. The membrane 4 is generated by a material weakening 23 in the end of the basic body 2 facing the pressure space, by suitable machinings on the basic body 2 which lead to this material weakening. In the present case a recess 22 facing the pressure space 3 is provided; the flattening 24 is provided facing the measuring device 6.

Conveniently the flattening 24 is arranged over the complete length of the basic body 2 in order to make applying the contact lines 61 easier.

The arrangement of the invention is chosen in FIG. 1 in such a way that the web 40 of the membrane 4 extends essentially parallel to the axis of the boring 37. For a tight connection of the basic body 2 with the wall 31 serves in particular a thread 33 as well as the seal 5.

Conveniently the recess 22 is orientated co-axially to the opening 35, so that the accurate radial arrangement of the bolt-like basic body 2 in the boring 32 is not decisive. Conveniently the recess 22 has the same diameter as the opening 35, however, also different diameters can be selected, although a possible throttle effect has to be taken into consideration here which can possibly lead to an influence on the pressure which has to be measured.

In the embodiment shown in FIG. 3 the membrane 4 is designed like a disc 41. However, also here the membrane 4 has been generated from a material weakening of the basic body 2. Here an under-milling 25 is provided which leads to a disc-like or slab-like membrane 4, 41. In this example a sleeve 7 is provided which holds the basic body 2. The basic body 2 again has an external thread which interacts with a corresponding internal thread of the sleeve 7. The arrangement here is chosen in such a way that the sleeve 7 supports in the front region facing the pressure space 3 the membrane 4. For that purpose the disc-like 41 membrane is supported by the edge 70 of the sleeve.

The sleeve itself has an external thread through which the pressure sensor can be screwed in the boring 32. By a suitable adjustment the arrangement is sealed. In this embodiment the membrane is orientated rectangular to the axis 37 of the boring. Of course, this arrangement can in the same way also be used in a boring designed as blind boring. On the side opposite the pressure space of the membrane 4 the measuring device 6 is arranged which is connected electrically by means of the contact line 61 to a link.

In a preferred modification the basic body 2 is designed over its length altogether as flattened bolt 20 which carries on its end opposite the pressure space 3 a fastening nut or a screw head which is designed here in such a way that through it the contact is created.

In FIG. 4 an improved embodiment of the pressure sensor according to the invention is shown. The arrangement there, in particular with respect to the arrangement of the contact line 61 and the membrane 4 is very similar to the conditions shown in FIG. 1, respectively FIG. 2.

The pressure sensor extends longitudinally. The pressure sensor 1 has in the right hand part of FIG. 4 a screw head or nut head 10 through which the pressure sensor 1 can be screwed in by means of the thread 29, which is located on the left hand side of the screw or nut head 10, in a suitable thread of the opening of the pressure space (not shown here). In this region the pressure sensor 1 has also its largest width; the pressure sensor tapers evenly to the front in the direction of the membrane 4 (shown at the left end). The pressure sensor is in this embodiment very similar to a spark plug or a glow plug.

At the front end, where the pressure sensor 1 has its smallest diameter, the membrane 4 is located which is only followed at the front end by the seal receiver 26. The seal receiver 26 has, as described, the same tasks as the supporting edge 21 according to FIG. 2; the complete pressure sensor 1 is built in a (pocket hole) boring 32, which is not shown, and the seal receiver 26 interacts with a shoulder, the bottom of the pocket hole boring. The arrangement is here chosen in such away that the front end 22 facing the end aligns with the opening 35, respectively communicates with it, and therefore there is a direct access to the volume of the pressure space 3.

The bottom side of the membrane 4 is thus in contact with the pressure of the pressure space 3. On the top side shown here, the side opposite the pressure, there is the membrane 4 of the measuring device 6 which is designed as elastic measuring strip 60. Four contact lines 61 are provided altogether through which the corresponding changes of the voltage because of the altered resistances of the elastic measuring strips can be sensed. This is carried out, for example, according to a principle of the Wheatstone bridge. It is shown that the contact lines 61 run parallel at first, and then spread roughly in the same region where also the pressure sensor widens, and then run again parallel in order to run then into suitable contact faces 64.

The contact faces 64 are arranged almost in the center of the pressure sensor 1. It is convenient to arrange the contact faces 64, if possible, far in the back region which is regularly cooler than the front region of the pressure sensor as temperature-sensitive cable connections have to be attached to the contact faces 64.

An opening 27 is linked to the contact face 64 on the right hand side to the back. This opening 27 connects the top surface of the flattening 24 with the interior of the final opening 28. The final opening 28, shown enlarged in FIG. 6, is worked from the wide region of the basic body 2 cylinder-like, for example bored.

In FIG. 6 the back view of the pressure sensor according to FIG. 4 is shown. The final opening 28 is here designed in such a way that it is suited for receiving the board of an evaluating unit 63. For that, for example, in the side walls 201 grooves 202 are worked in which serve as guides for the board of the evaluating unit 63.

Through the opening 27 now suitable connection lines not shown can connect the contact face 64 with the board of the evaluating unit 63.

The pressure sensor 1 according to the invention shown in FIG. 4 is designed, at least in the region of the membrane, in one piece, that means the membrane 4 has been generated by a suitable tapering of the wall thickness. For that purpose, on the one hand, the flattening 24 serves, and, on the other hand, the recess 22, which, arranged accordingly, leads to a corresponding membrane-like material weakening 23. The arrangement is here chosen in such a way that the cone-like seal receiver 26 is completely rotating, that means the flattening 24 in the foremost region, in the region of the seal receiver 26, is shouldered. This one-piece embodiment has advantages in the sealing features of the complete arrangement.

The elastic measuring strip 60 as well as the contact lines 61, including the contact faces 64, have been applied preferably in a common thin-film coating process. Here, if necessary, the complete pressure sensor is put in a coating device, and the flattening 24 is coated as desired. As, for example, an electrically conductive basic body is provided here first of all a suitable insulating buffer layer is applied, for example coated or sputtered which then holds the elastic measuring strip, respectively the contact lines.

As insulating materials here for example silicon dioxide, sapphire ($Al_2O_3$) and other known insulating materials which can be applied with a coating process are used. The strip conductors consist conveniently of metal with a specific resistance as small as possible, for example gold or the like.

The construction shown in FIG. 5 is essentially identical with the construction shown in FIG. 4, so that repetitions are left out here. The modification according to the invention according to FIG. 5 differs from the one in FIG. 4 by the fact that the membrane 4 is not worked from the basic body 2 in one piece, but the basic body 2 has a membrane opening 42 in its front region through which there is access from the top surface, the flattening 24 to the opening 22, when the membrane 4 is not built in, as shown here.

In the membrane opening 42 then the suitable membrane 4 is built in. The membrane 4 has then for example a relatively short contact line 61, and is connected, for example, with the evaluating unit 63 by suitable cable lines.

It is obvious that in this modification according to the invention a much more smaller component has to be coated in the expensive coating device. The surface of the membrane opening 24 which has to be closed by the membrane 4 is clearly smaller than the surface according FIG. 4 which has to be coated where additionally it has to be taken into consideration that the complete pressure sensor occupies precious space in a coating device.

However, both modifications are part of the invention.

Figure 7:
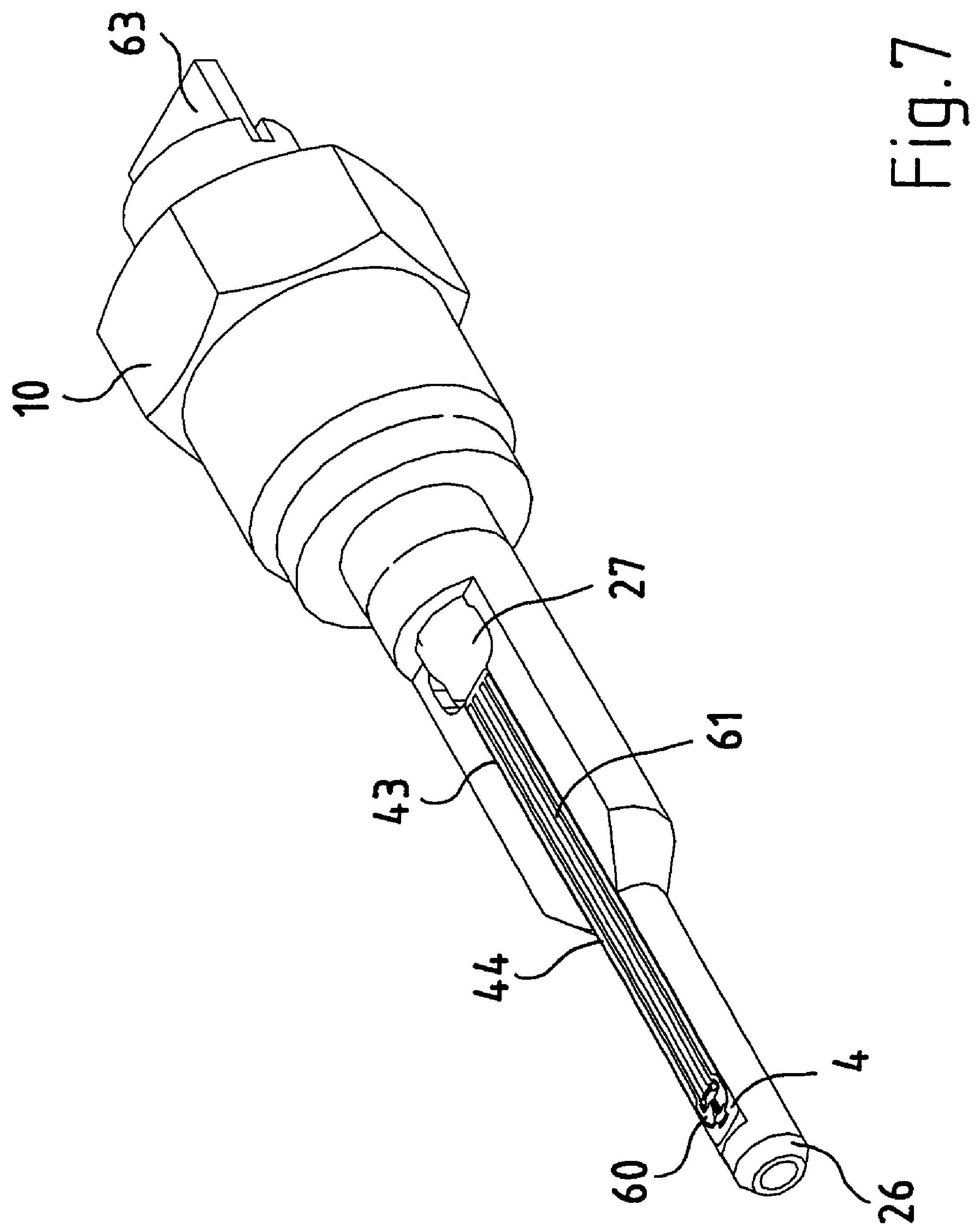
Figure 8:
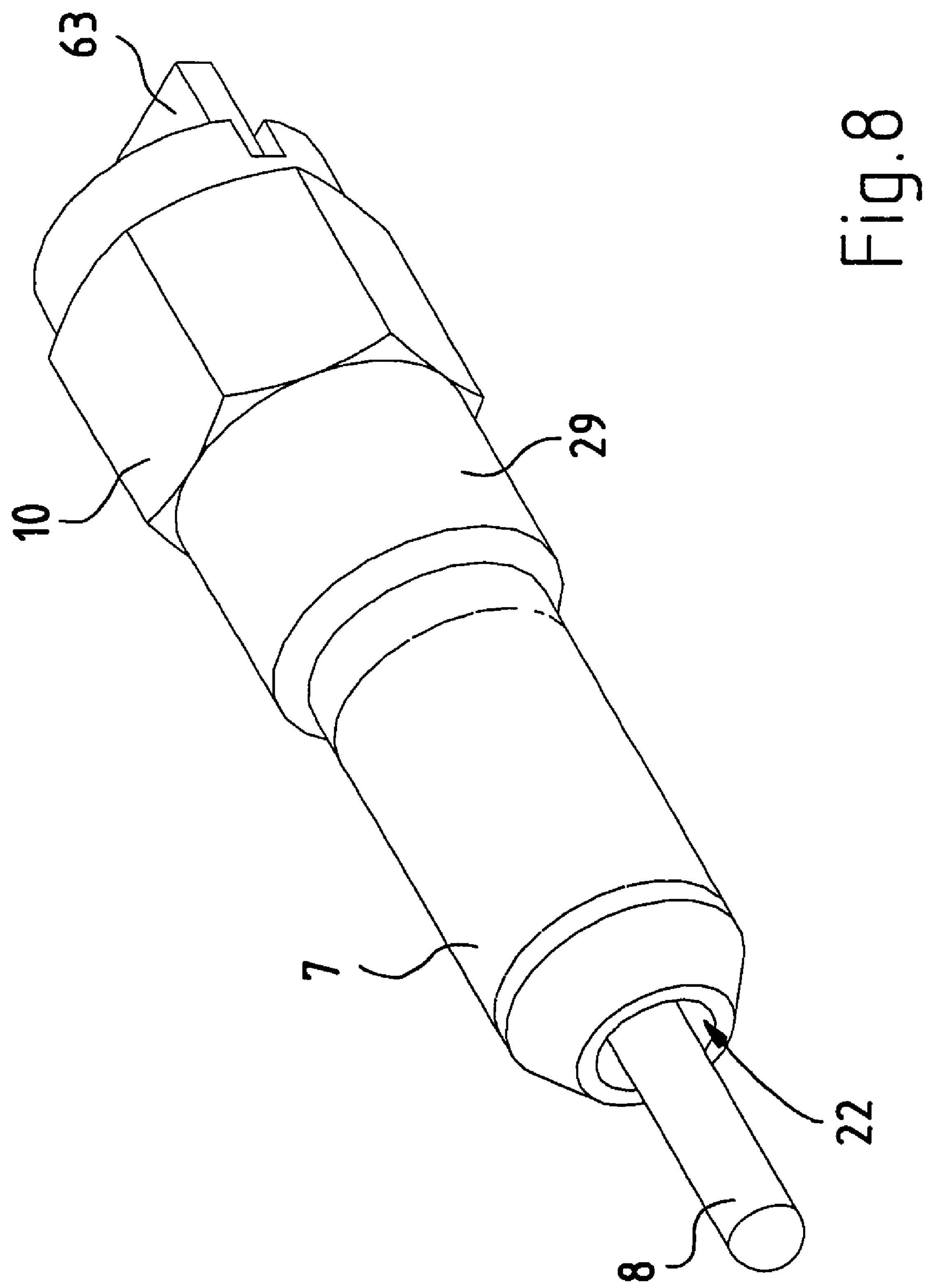

In FIG. 7 another modification according to the invention is shown. The modification according to FIG. 7 differs from the one according to FIG. 5 in that that a clearly larger element is built in the pressure sensor. As in the modification according to FIG. 5 in the front region, in the region of membrane 4, a membrane opening 42 is provided. However, this is connected in the direction of the opening 27 a membrane recess 43 which has just such a depth as the element which is put there afterwards. This is the membrane holding device 44. The membrane recess 43 is here just designed in such away that the membrane holding device can sit snugly.

According to a modification of the invention it is suggested that the membrane holding device 44 holds the membrane 4 at its front end. The installation is carried out of course in such a way that the arrangement altogether is sealed and the membrane works.

In the example shown here the membrane holding device 44 carries also at the same time the contact lines 61. This modification is very convenient with respect to the thermal marginal conditions, as over a long region, almost half of the complete length of the sensor, the membrane holding device extends, and on it the contact lines 61 are arranged, and the bonding of the cables for connecting with the evaluating unit 63 (through the opening 27) has only to be carried out to a cool place located relatively far inside. A relatively long membrane holding device is, of course, also optimal if it is complete, that means serves in its total length as contact line 61, with respect to the use of the coating capacities.

Namely also the membrane holding device 44 carries the contact lines 61 as well as the measuring device 6, in thin-film technology, as already described several times.

The pressure sensors shown in the embodiments according to FIGS. 4, 5 and 7 usually have to be protected just in the sensitive region of the measuring device 6. For that purpose conveniently a sleeve 7 is pushed on the front region of the pressure sensor 1. Such a sleeve 7 is shown, for example, in the modification according to FIG. 8.

The modification shown here has additionally a glow plug 8 which projects from the front recess 22 facing the end. Between the glow plug 8 and the wall of the recess 22 remains sufficient space so that the measuring of the pressure by the membrane 4, which is covered in this arrangement, is not obstructed. The glow plug 8 has the task, for instance in a Diesel engine, to provide pre-glowing, and thus to influence the ignition of the Diesel engine positively.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece integrated into the basic body.

2. The pressure sensor according to claim 1, further comprising at least one contact line for connecting the measuring device with a link region or an evaluating unit.

3. The pressure sensor according to claim 1, further comprising at least one contact line for connecting the measuring device with a link region or an evaluating unit, and the contact line is provided on a side opposite the pressure space.

4. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece integrated into the basic body, and set in and sealed in the basic body, the membrane being part of a membrane holding device, and the membrane holding device carrying contact lines.

5. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece integrated into the basic body, and set in and sealed in the basic body, the membrane being formed by a material weakening of the basic body.

6. The pressure sensor according to claim 1, wherein the basic body includes a thread for engaging a boring of the wall, and the thread is arranged in a back region of the basic body.

7. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, a blind boring of the wall, and in a bottom of the blind boring an opening to the pressure space being provided, and the opening and the blind hole being co-axial.

8. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, according to claim 1, a blind hole of the wall, and in a bottom of the blind hole an opening being provided to the pressure space, and a supporting edge of the basic body being arranged in a region of the membrane and interacting in a built-in condition with a seal arranged between the basic body and the bottom of the blind hole.

9. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, a supporting edge of the basic body, a blind hole in the wall, and in a bottom of the blind boring an opening being provided to the pressure space, and the supporting edge sifting close to a cylinder wall of the boring.

10. The pressure sensor according to claim 1, wherein the basic body has at least one of a recess at an end facing the pressure space and a flattening in a region facing the pressure space.

11. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the basic body having on an end facing the pressure space a blind hole-like recess, and the recess at least co-serves for a material weakening of the basic body for forming the membrane.

12. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the basic body being screwed in a thread of a boring of the wall, and the membrane extending essentially parallel to an axis of the boring.

13. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the membrane being formed by a material weakening of the basic body in such a way that on one side of the membrane a recess being arranged, and on the other side a flattening being located on the basic body.

14. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, at least one contact line for connecting the measuring device with a link region or an evaluating unit, and the evaluating unit being arranged on a board, and in a final opening guide grooves being provided for holding the board.

15. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the basic body having on a region facing the pressure space a flattening, and the flattening having on an end opposite the membrane an opening to a final opening.

16. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the membrane being a disc, and the membrane being supported at least by a part of a sleeve edge, the measuring device acting resistively, capacitively or inductively.

17. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece integrated into the basic body, and set in and sealed in the basic body, the measuring device being located on the membrane as a thin-film layer.

18. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the basic body being at least partly prismatic and having at least in a region facing the pressure space a flattening, and the basic body having on a front face facing the pressure space a recess, the membrane extending between the flattening and the recess.

19. A pressure sensor comprising a membrane, a measuring device receiving a deformation of the membrane caused by pressure from a pressurised pressure space, a basic body including the membrane and the measuring device for setting in an opening of a wall defining the pressure space, the membrane being arranged parallel or acute to a surface normal line of the opening, the membrane being one piece with the basic body, and set in and sealed in the basic body, the basic body having a recess at a front side facing the pressure space, and a glow plug being distanced from an interior wall of the recess.

20. A pressure collecting arrangement for internal combustion engines where a wall defining the pressure space has a boring for holding the pressure sensor according to claim 1.

* * * * *